(12) United States Patent
LaRocque et al.

(10) Patent No.: US 10,689,263 B2
(45) Date of Patent: *Jun. 23, 2020

(54) WATER VAPOR DISTILLATION APPARATUS, METHOD AND SYSTEM

(71) Applicant: DEKA Products Limited Partnership, Manchester, NH (US)

(72) Inventors: Ryan K. LaRocque, Manchester, NH (US); Dean Kamen, Bedford, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 151 days.

This patent is subject to a terminal disclaimer.

(21) Appl. No.: 14/856,828

(22) Filed: Sep. 17, 2015

(65) Prior Publication Data

US 2016/0244338 A1   Aug. 25, 2016

Related U.S. Application Data

(60) Provisional application No. 62/051,646, filed on Sep. 17, 2014.

(51) Int. Cl.
| | |
|---|---|
| *C02F 1/04* | (2006.01) |
| *B01D 3/42* | (2006.01) |
| *C02F 1/00* | (2006.01) |
| *C02F 1/18* | (2006.01) |
| *B01D 3/00* | (2006.01) |

(52) U.S. Cl.
CPC .............. *C02F 1/006* (2013.01); *B01D 3/008* (2013.01); *B01D 3/42* (2013.01); *C02F 1/008* (2013.01); *C02F 1/04* (2013.01); *C02F 1/041* (2013.01); *C02F 1/043* (2013.01); *C02F 1/18* (2013.01); *C02F 2209/42* (2013.01); *C02F 2307/12* (2013.01)

(58) Field of Classification Search
CPC . B01D 3/008; B01D 3/42; C02F 1/006; C02F 1/008; C02F 1/04; C02F 1/043
See application file for complete search history.

(56) References Cited

U.S. PATENT DOCUMENTS

| | | | | |
|---|---|---|---|---|
| 8,359,877 B2* | 1/2013 | Kamen | ................ | B01D 1/0082 62/285 |
| 8,511,105 B2* | 8/2013 | Kamen | .................... | B01D 1/28 62/285 |
| 8,888,963 B2* | 11/2014 | Kamen | ................ | B01D 1/0082 202/185.1 |
| 9,309,104 B2* | 4/2016 | Kamen | .................... | B01D 1/28 |

(Continued)

*Primary Examiner* — Renee Robinson
(74) *Attorney, Agent, or Firm* — Michael George Norris

(57) ABSTRACT

A system for water dispensing. The system includes a housing comprising a first and second portion; a water vapor distillation apparatus housed in the first portion of the housing, the water vapor distillation apparatus producing a distilled water product; at least one storage tank housed in the second portion of the housing and fluidly connected to the water vapor distillation apparatus; at least one pump housed in the second portion of the housing and fluidly connected to the at least one storage tank; and at least one appliance located outside of the housing and fluidly connected to the at least one pump, wherein the distilled water product is stored in the at least one storage tank and the pump pumps water from the at least one storage tank to the at least one appliance.

21 Claims, 7 Drawing Sheets

(56) References Cited

U.S. PATENT DOCUMENTS

2008/0022694 A1* 1/2008 Anderson ............ B01D 5/0072
62/3.4
2010/0101929 A1* 4/2010 Kamen .................... B01D 1/28
202/185.3

* cited by examiner

WATER VAPOR DISTILLATION APPARATUS, METHOD AND SYSTEM

CROSS REFERENCE TO RELATED APPLICATION(S)

The present application is a Non-Provisional Application which claims priority from U.S. Provisional Patent Application Ser. No. 62/051,646, filed Sep. 17, 2014 and entitled Water Vapor Distillation Apparatus, Method and System, which is hereby incorporated herein by reference in its entirety.

TECHNICAL FIELD

The present invention relates to water distillation and more particularly, to a water vapor distillation apparatus, method, and system.

BACKGROUND INFORMATION

A dependable source of clean water eludes vast segments of humanity. For example, the Canadian International Development Agency reports that about 1.2 billion people lack access to safe drinking water. Published reports attribute millions and millions of deaths per year, mostly children, to water related diseases. Many water purification techniques are well known, including carbon filters, chlorination, pasteurization, and reverse osmosis. Many of these techniques are significantly affected by variations in the water quality and do not address a wide variety of common contaminants, such as bacteria, viruses, organics, arsenic, lead, mercury, and pesticides that may be found in water supplies in the developing world and elsewhere. Some of these systems require access to a supply of consumables, such as filters or chemicals. Moreover, some of these techniques are only well suited to centralized, large-scale water systems that require both a significant infrastructure and highly trained operators. The ability to produce reliable clean water without regard to the water source, on a smaller, decentralized scale, without the need for consumables and constant maintenance is very desirable, particularly in the developing world. The use of vapor compression distillation to purify water is well known and may address many of these concerns. However, the poor financial resources, limited technical assets, and low population density that does not make it feasible to build centralized, large-scale water systems in much of the developing world, also limits the availability of adequate, affordable, and reliable power to operate vapor compression distillation systems, as well as hindering the ability to properly maintain such systems. In such circumstances, an improved vapor compression distillation system and associated components that increases efficiency and production capability, while decreasing the necessary power budget for system operation and the amount of system maintenance required may provide a solution.

SUMMARY

In accordance with one aspect of the present invention, a system for water dispensing is disclosed. The system includes a housing comprising a first and second portion; a water vapor distillation apparatus housed in the first portion of the housing, the water vapor distillation apparatus producing a distilled water product; at least one storage tank housed in the second portion of the housing and fluidly connected to the water vapor distillation apparatus; at least one pump housed in the second portion of the housing and fluidly connected to the at least one storage tank; and at least one appliance located outside of the housing and fluidly connected to the at least one pump, wherein the distilled water product is stored in the at least one storage tank and the pump pumps water from the at least one storage tank to the at least one appliance. Some embodiments may include one or more of the following: wherein the housing comprising a cabinet and a counter; further including at least one electronics box housed in the second portion of the housing; further including at least one chiller housed in the second portion of the housing; further including at least one sensor in the at least one storage tank; wherein the at least one sensor comprising a volume full sensor; wherein the at least one sensor comprising an empty tank sensor; wherein the at least one sensor comprising a volume full sensor and a empty tank sensor, wherein the volume full sensor and the empty tank sensor are switches with hysteresis; wherein when the volume full sensor and empty tank sensor indicate the storage tank is below a threshold, the volume full sensor or empty tank sensor turns the water vapor distillation apparatus on; wherein when the volume full sensor and empty tank sensor indicate the storage tank is above a threshold, the volume full sensor or empty tank sensor turns the water vapor distillation apparatus off; wherein the second section further comprising an accumulator; wherein the at least one pump pumps water from the storage tank to the accumulated and then into a chiller.

In accordance with one aspect of the present invention, a system for water dispensing is disclosed. The system includes a housing including a first and second portion, a water vapor distillation apparatus housed in the first portion of the housing, the water vapor distillation apparatus producing a distilled water product, at least one storage tank housed in the second portion of the housing and fluidly connected to the water vapor distillation apparatus, an accumulator housing in the second portion of the housing and fluidly connected to the at least one storage tank, at least one pump housed in the second portion of the housing and fluidly connected to the at least one storage tank and the accumulator, and at least one appliance located outside of the housing and fluidly connected to the at least one pump, wherein the distilled water product is stored in the at least one storage tank and the pump pumps water from the at least one storage tank to the at least one appliance.

Some embodiments may include one or more of the following: wherein the housing comprising a cabinet and a counter; further including at least one electronics box housed in the second portion of the housing; further including at least one chiller housed in the second portion of the housing; further including at least one sensor in the at least one storage tank; wherein the at least one sensor comprising a volume full sensor; wherein the at least one sensor comprising an empty tank sensor; wherein the at least one sensor comprising a volume full sensor and a empty tank sensor, wherein the volume full sensor and the empty tank sensor are switches with hysteresis; wherein when the volume full sensor and empty tank sensor indicate the storage tank is below a threshold, the volume full sensor or empty tank sensor turns the water vapor distillation apparatus on; wherein when the volume full sensor and empty tank sensor indicate the storage tank is above a threshold, the volume full sensor or empty tank sensor turns the water vapor distillation apparatus off; wherein the at least one pump pumps water from the storage tank to the accumulated and then into a chiller.

These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein.

DETAILED DESCRIPTION OF EXEMPLARY EMBODIMENTS

In various embodiments, any one or more of the various embodiments of the water vapor distillation apparatus described in U.S. patent application Ser. No. 13/052,195, now U.S. Publication No. 2014/0202542 A1 and entitled Fluid Delivery Systems and Methods, filed 26 Jul. 2013 and published on 24 Jul. 2014, and U.S. Pat. No. 8,359,877 B2 and entitled Water Vending Apparatus, which was issued 29 Jan. 2013, in which the entire disclosures of each are herein incorporated by reference in their entireties may be used as an under-the-counter appliance and in various embodiments, the under-the-counter appliance embodiment of the water vapor distillation apparatus may be fluidly connected to one or more appliances and/or water dispensing and/or beverage dispensing appliances and/or apparatus. In some embodiments, the water vapor distillation apparatus described in the above incorporated references may be modified and in some of these embodiments, modification may include, but is not limited to, modifying the height of the evaporator/condenser and/or liquid heat exchanger.

Figure 1:
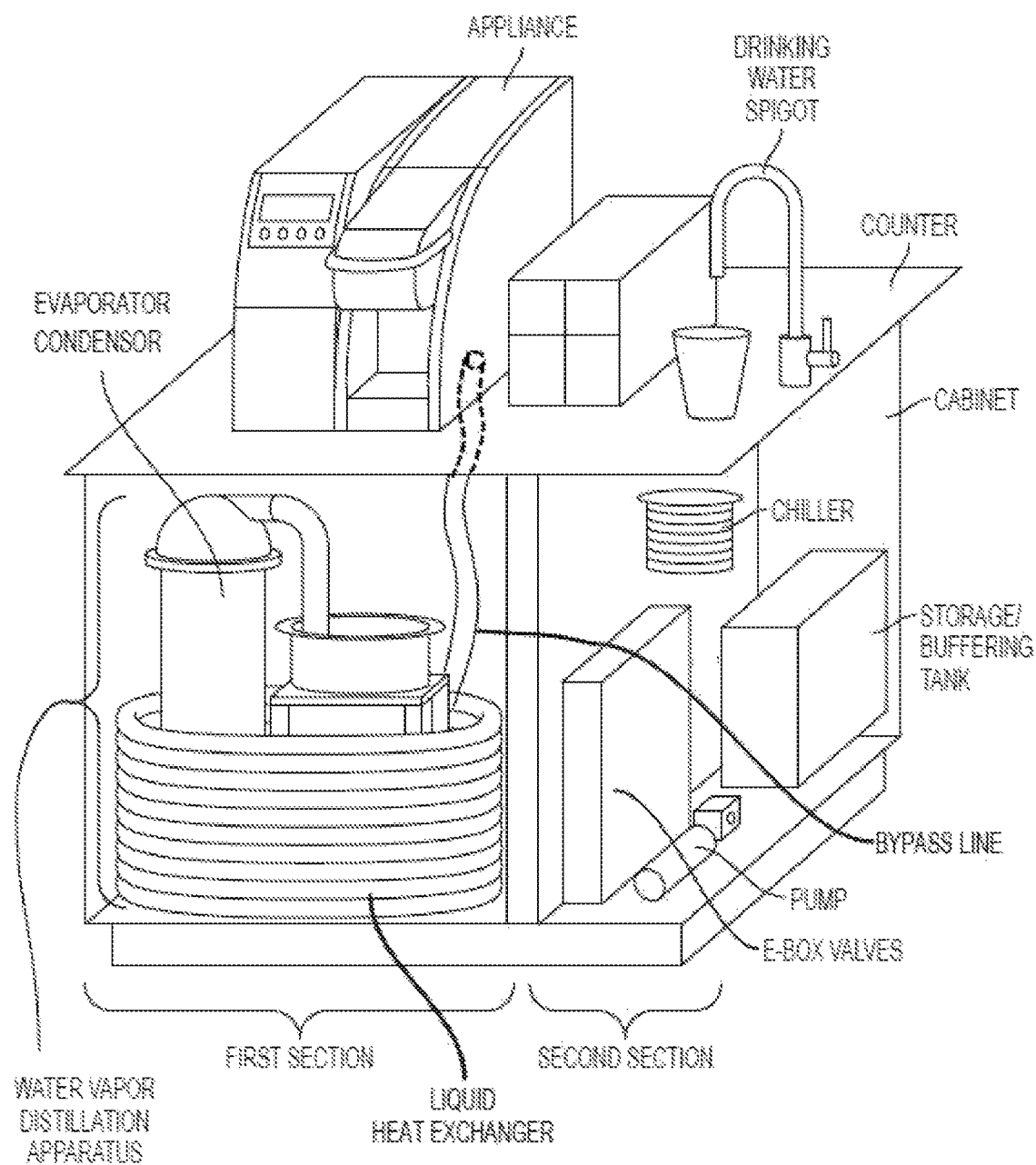
FIGS. 1-7 show various views and embodiments of a water vapor distillation system.
Figure 2:
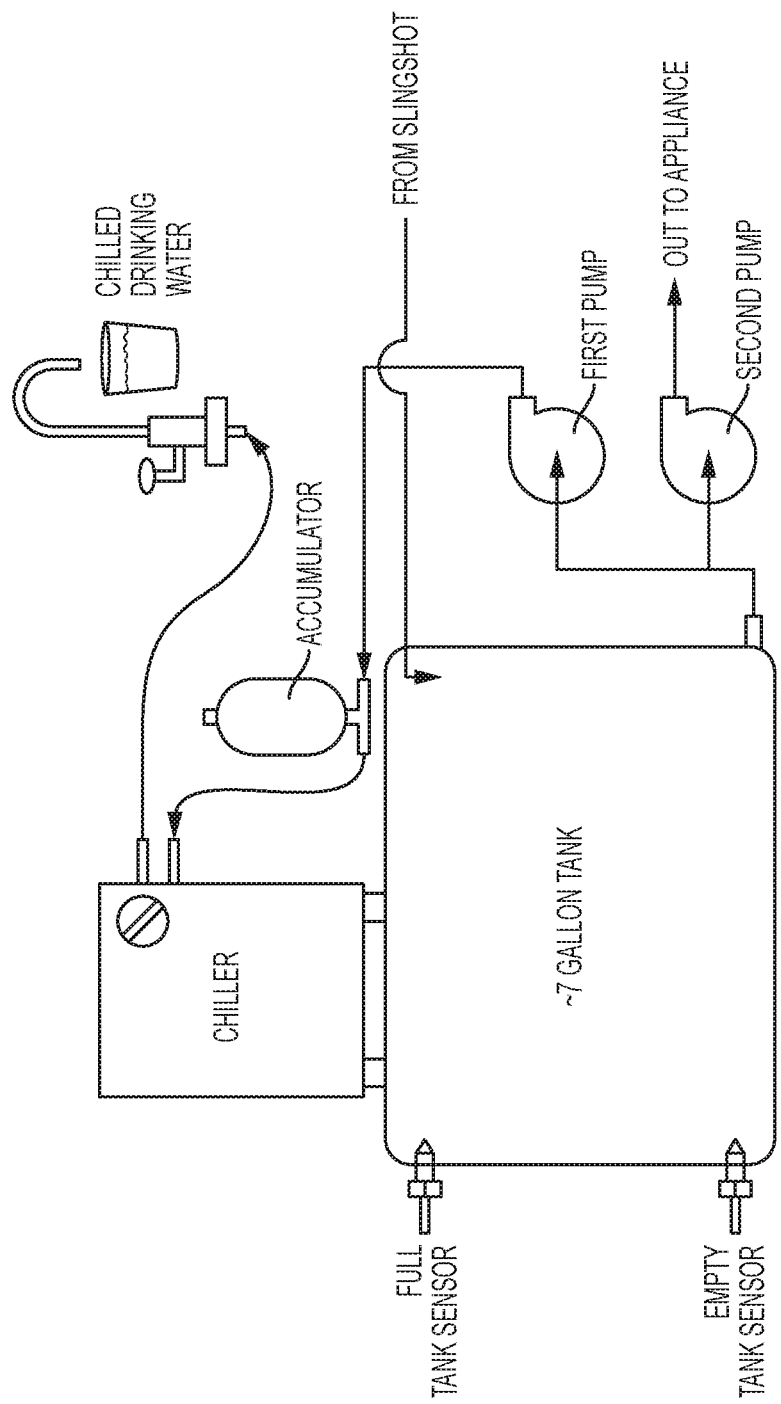
Figure 3:
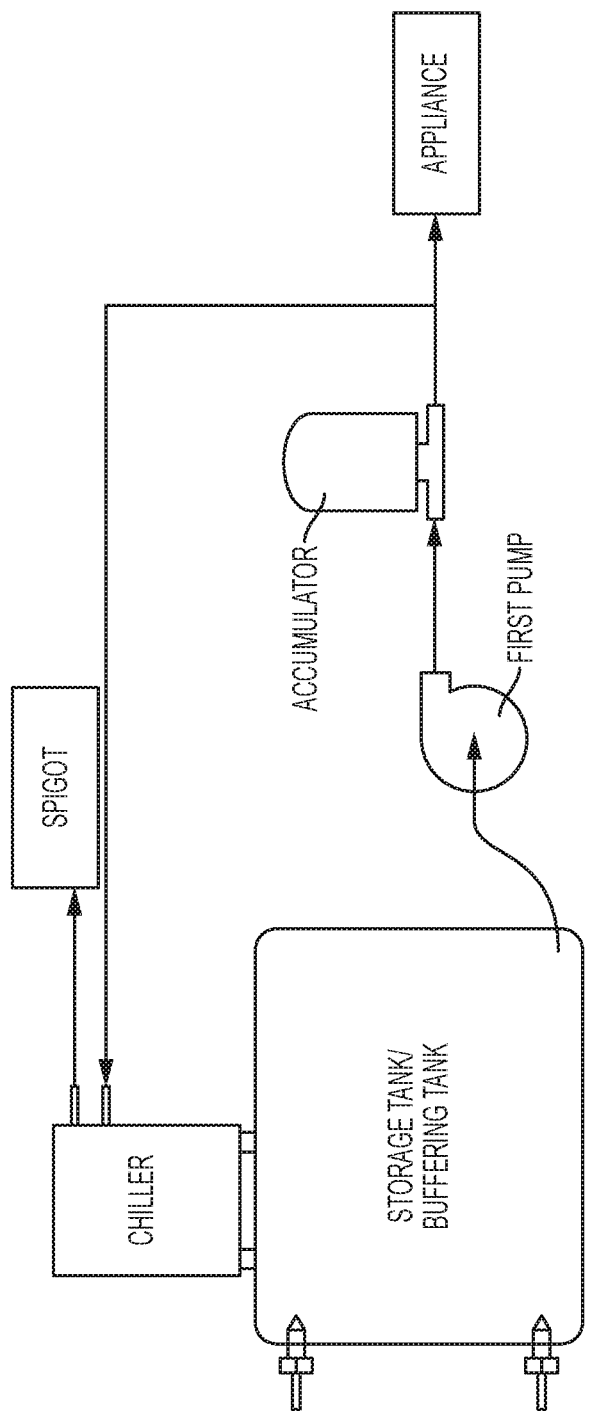
Figure 4:
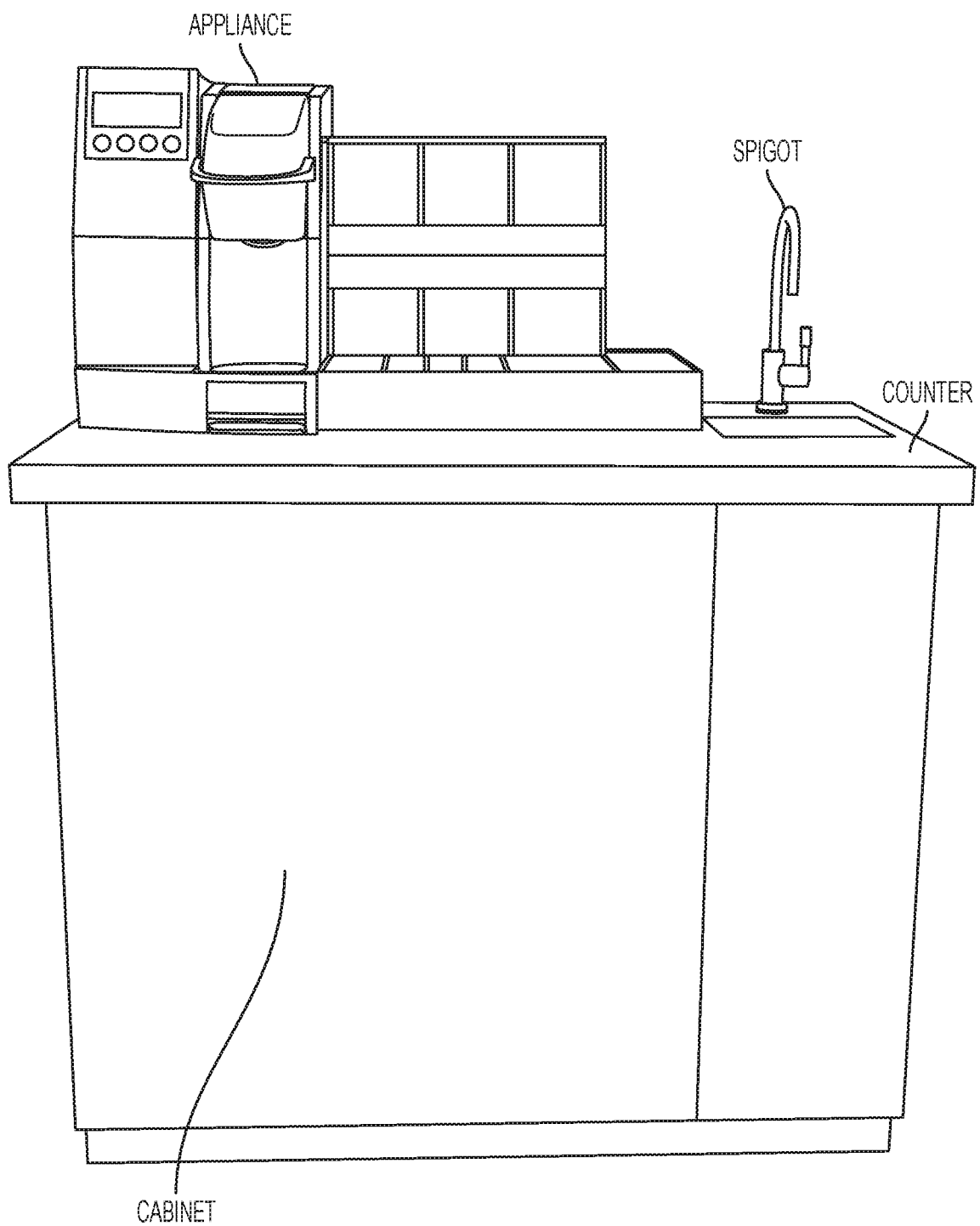
Figure 5:
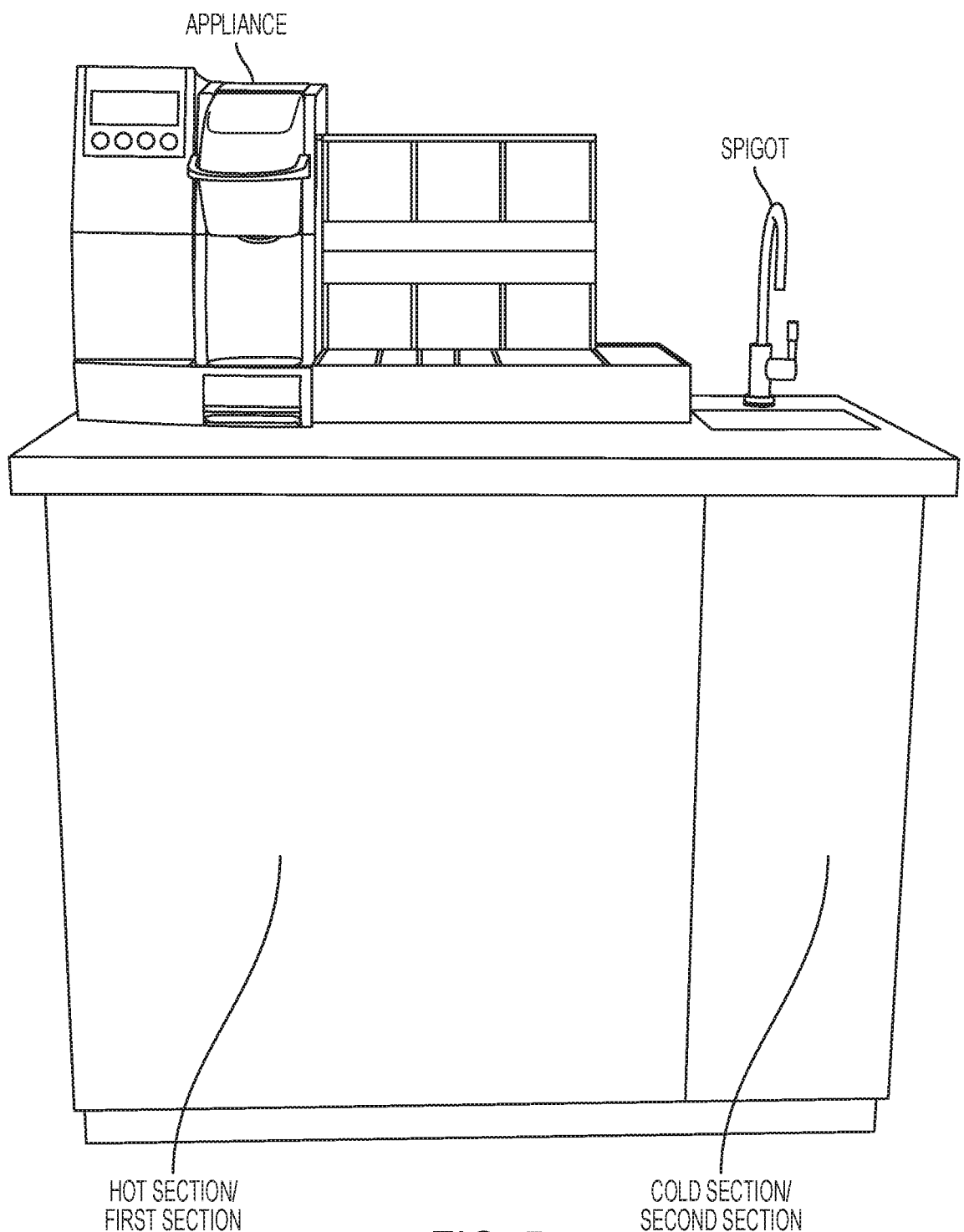
Figure 6:
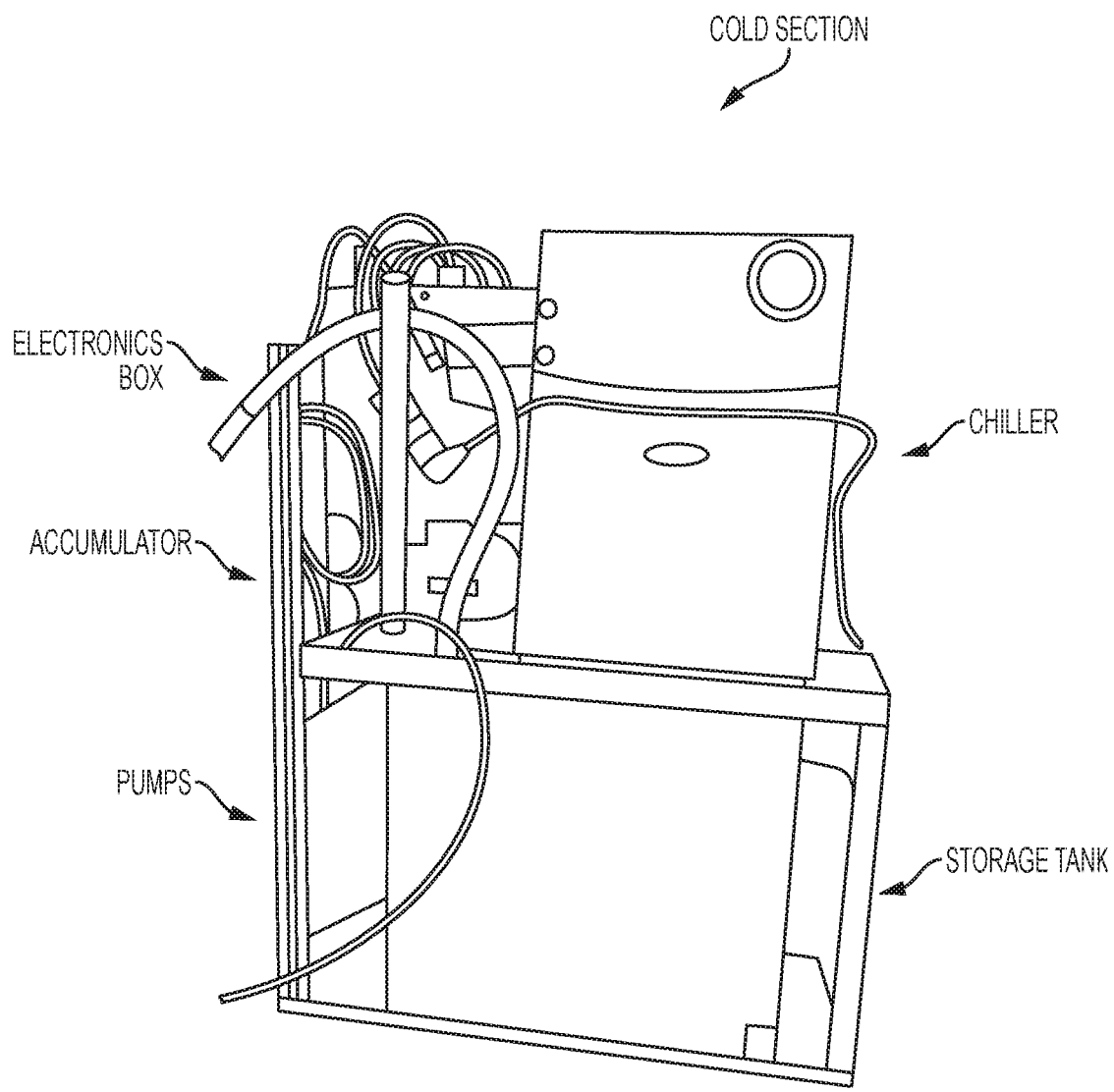
Figure 7:
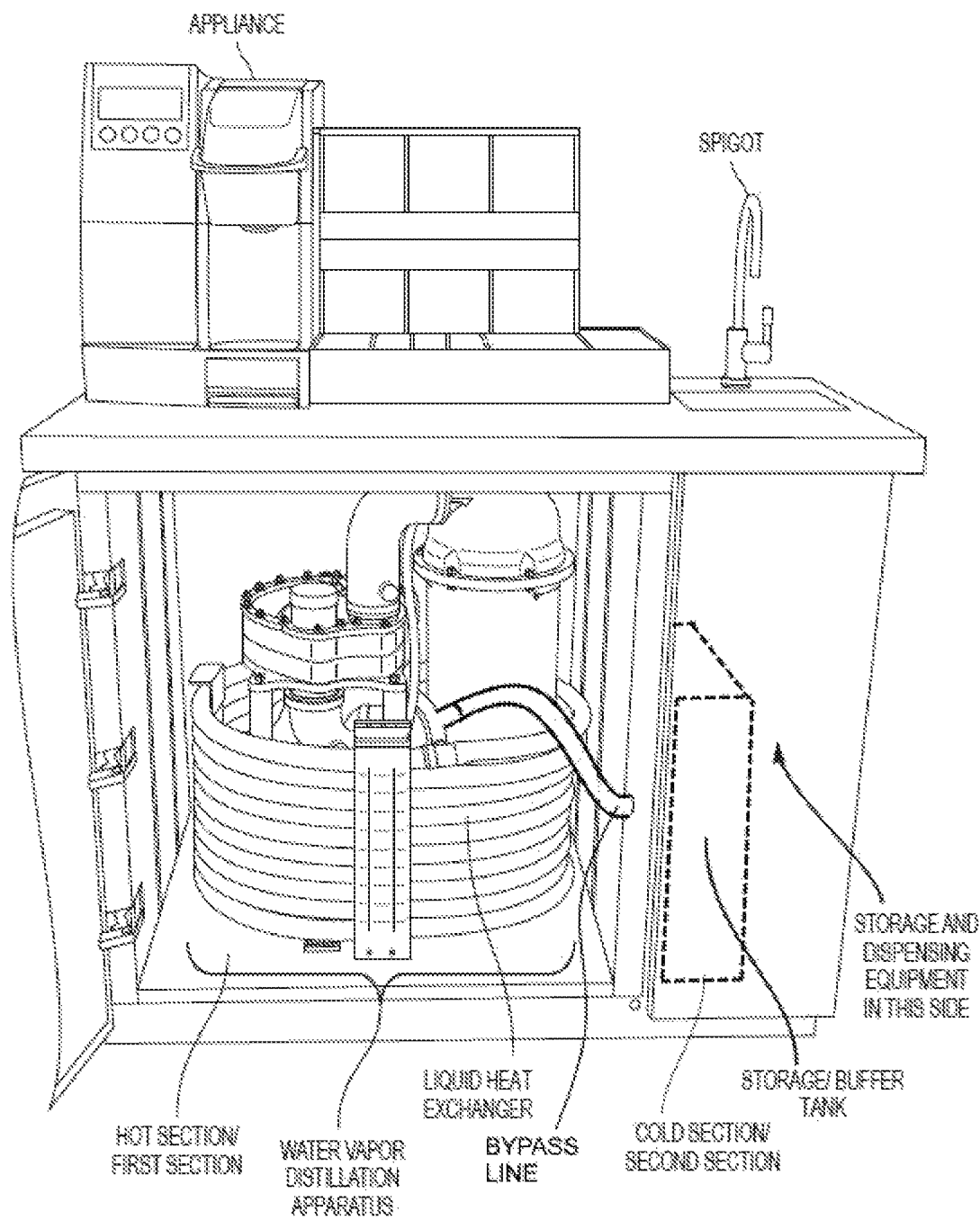

Referring now also to FIGS. 1-7, in various embodiments, any of the embodiments of the water vapor distillation apparatus shown and/or described in the above-incorporated references may be included in a system for water dispensing. The system includes a housing which, in some embodiments, is a cabinet with a counter. In some embodiments, the cabinet with a counter may be 36 inches tall and 25 inches deep, and/or a standard counter height and depth. In other embodiments, the cabinet with a counter may be any height or depth desired.

In various embodiments, the cabinet may include one or more sections and in some embodiments, the cabinet may include two sections. In some embodiments, a first section is included, which may be similar to the "hot section" shown and described in the above-incorporated references, wherein the hot components of the water vapor distillation apparatus are housed in the hot section. In some embodiments, a second section which may be similar to the "cold section" shown and described in the above-incorporated references, wherein the cold components (or components that may be desirable not to be kept in a hot section) of the water vapor distillation apparatus are housed in the cold section. These cold components may include, but are not limited to, one or more water storage tanks (or at least one storage tank), one or more electronics boxes (which may be termed "e-box") (or at least one electronics box), one or more pumps (or at least one pump) and one or more chillers (or at least one chiller). In various embodiments, the water vapor distillation apparatus produces distilled water which flows from the water vapor distillation apparatus into the storage tank/buffering tank.

In various embodiments, the at least one storage tank/buffering tank may be any size, but in some embodiments, may be 7 gallons or may be 5 gallons. However, any size tank may be used in various embodiments. In various embodiments, a storage tank/buffering tank may be desirable to provide water at peak demand times and/or to run the water vapor distillation apparatus to fill to storage tank to the desired volume and then turn off the water vapor distillation until and unless the volume in the storage tank falls below a predetermined threshold. In various embodiments, the storage tank/buffering tank may include one or more sensors and in some embodiments may include at least a volume full sensor and an empty tank sensor. In some embodiments, the volume full sensor and the empty tank sensor may be switches with hysteresis. In some embodiments, when the when the sensors indicate that the storage tank/buffering tank is below a threshold, the sensor turns the water vapor distillation apparatus on and when the sensors indicate that the storage tank/buffering tank is above a threshold, the sensor turns the water vapor distillation apparatus off. In various embodiments, the storage tank/buffering tank may have additional sensors including additional volume sensors.

In various embodiments, the second section, or cold section, may also include an accumulator. In various embodiments, an accumulator may be desirable/beneficial for buffering the water between the storage tank/buffering tank and the one or more appliance and/or apparatus. The accumulator provides for a smooth/continuous stream of water dispensing to the one or more appliance and/or apparatus.

The system may also include at least one pump, and in some embodiments, two or more pumps. The at least one pump pumps water from the storage tank/buffering tank to an appliance, for example, a KEURIG® machine/apparatus and/or another beverage dispensing apparatus and/or to another apparatus, for example, a spigot for delivering water. In some embodiments, the pump may pump water from the storage tank/buffering tank to an accumulator and then into a chiller, before the water is delivered through, for example, a spigot. This may be desirable both for providing a steady stream, rather than pulsitile stream, of water and for providing chilled water. In some embodiments, two pumps are used, and in these embodiments, a first pump may be dedicated to pumping water from the storage tank/buffering tank to the accumulator and the chiller and a second pump may be dedicated to pumping water from the storage tank/buffering tank to an appliance.

In various embodiments, the water vapor distillation apparatus fluid paths may vary and in some embodiments, the hot product water may bypass the liquid heat exchanger on demand and this hot product water may be diverted directly to an appliance and/or apparatus. In some embodiments, the hot product water may bypass the liquid heat exchanger on demand and this hot product water may be diverted directly to storage tank/buffering tank. In some embodiments, the system may include a processor and the processor may be preprogrammed to schedule the bypassing of the hot water to a storage tank/buffering tank. For example, in some embodiments, it may be desirable/beneficial to preprogram the bypass for example for the morning and the afternoon. This may provide ample hot water in the storage tank/buffering tank for delivery to a KEURIG® machine and/or other hot beverage dispenser, which may save time during this high demand times for hot beverages, including, for example, but not limited to, coffee and/or tea, in a shared appliance setting, for example.

In various embodiments, the spigot and/or KEURIG® machine (or any other appliance or apparatus) may include a manual valve where, when open, the at least one pump detects a drop in pressure and turns the pump on, and water is delivered to the spigot or other appliance or apparatus. When the valve is closed, the pump detects a rise in pressure and then stops pumping water. In some embodiments, a first pump is fluidly connected to the spigot and a second pump is fluidly connected to the KEURIG® machine (or any other appliance or apparatus). As discussed herein, in various embodiments, a single pump may be used. In these embodiments, the pump may include a "T" in the fluid line leading out of the pump, where one line leads to a chiller/spigot or other appliance or apparatus and the other leads to a KEURIG® machine (or any other appliance or apparatus)

The term KEURIG® machine is used herein, however, this disclosure is not limited to a KEURIG® machine. Rather, any appliance and/or apparatus may be used within the system disclosed herein. Other appliances may include, but are not limited to, soda dispensers (including a Soda Stream), water dispensers, coffee makers, electric kettles, juice maker, blenders, etc.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A system for water dispensing comprising:
a housing comprising a first and second portion;
a hot beverage dispenser located separate from the housing;
a water vapor distillation apparatus housed in the first portion of the housing, the water vapor distillation apparatus comprising an evaporator/condenser and a liquid heat exchanger, the evaporator/condenser producing a hot distilled water product, wherein the hot distilled water product is either fed into the liquid heat exchanger and exits as distilled water product or is diverted to the hot beverage dispenser thereby bypassing the liquid heat exchanger;
at least one storage tank housed in the second portion of the housing and fluidly connected to the water vapor distillation apparatus;
a first pump housed in the second portion of the housing and fluidly connected to the at least one storage tank and the hot beverage dispenser; and
a processor,
wherein the distilled water product is stored in the at least one storage tank and the first pump pumps water from the at least one storage tank to the hot beverage dispenser, and
wherein the processor is preprogrammed to schedule the diverting of the hot distilled water product to the hot beverage dispenser at a preprogrammed time.

2. The system of claim 1, wherein the housing comprising a cabinet and a counter.

3. The system of claim 1, further comprising at least one chiller housed in the second portion of the housing.

4. The system of claim 1, further comprising at least one sensor in the at least one storage tank.

5. The system of claim 4, wherein the at least one sensor comprising a volume full sensor.

6. The system of claim 4, wherein the at least one sensor comprising an empty tank sensor.

7. The system of claim 4, wherein the at least one sensor comprising a volume full sensor and a empty tank sensor, wherein the volume full sensor and the empty tank sensor are switches with hysteresis.

8. The system of claim 7, wherein when the volume full sensor and empty tank sensor indicate the storage tank is below a threshold, the volume full sensor or empty tank sensor turns the water vapor distillation apparatus on.

9. The system of claim 7, wherein when the volume full sensor and empty tank sensor indicate the storage tank is above a threshold, the volume full sensor or empty tank sensor turns the water vapor distillation apparatus off.

10. The system of claim 1, wherein the second section further comprising an accumulator.

11. The system of claim 10, wherein a second pump pumps water from the storage tank to the accumulator and then into a chiller.

12. A system for water dispensing comprising:
a housing comprising a first and second portion;
at least one storage tank housed in the second portion of the housing and fluidly connected to a water vapor distillation apparatus;
the water vapor distillation apparatus housed in the first portion of the housing, the water vapor distillation apparatus comprising an evaporator/condenser and a liquid heat exchanger, the evaporator/condenser producing a hot distilled water product, wherein the hot distilled water product is either fed into the liquid heat exchanger and exits as distilled water product or diverted to the at least one storage tank and bypassing the liquid heat exchanger;
an accumulator housed in the second portion of the housing and fluidly connected to the at least one storage tank;
a first pump housed in the second portion of the housing and fluidly connected to the at least one storage tank and the accumulator;
a second pump fluidly connected to at least one storage tank;
at least one hot beverage dispenser located separate from the housing and fluidly connected to the second pump; and
a processor,
wherein the distilled water product is stored in the at least one storage tank and the second pump pumps water from the at least one storage tank to the at least one hot beverage dispenser, and
wherein the processor is preprogrammed to schedule the bypassing of the hot distilled water product to the at least one storage tank at a preprogrammed time.

13. The system of claim 12, wherein the housing comprising a cabinet and a counter.

14. The system of claim 12, further comprising at least one chiller housed in the second portion of the housing.

15. The system of claim 12, further comprising at least one sensor in the at least one storage tank.

16. The system of claim 15, wherein the at least one sensor comprising a volume full sensor.

17. The system of claim 15, wherein the at least one sensor comprising an empty tank sensor.

18. The system of claim 15, wherein the at least one sensor comprising a volume full sensor and a empty tank sensor, wherein the volume full sensor and the empty tank sensor are switches with hysteresis.

19. The system of claim 18, wherein when the volume full sensor and empty tank sensor indicate the storage tank is below a threshold, the volume full sensor or empty tank sensor turns the water vapor distillation apparatus on.

20. The system of claim 18, wherein when the volume full sensor and empty tank sensor indicate the storage tank is above a threshold, the volume full sensor or empty tank sensor turns the water vapor distillation apparatus off.

21. The system of claim 12, wherein the first pump pumps water from the storage tank to the accumulator and then into a chiller.

\* \* \* \* \*